No. 680,897. Patented Aug. 20, 1901.
P. SWEENEY.
JOURNAL BEARING.
(Application filed Sept. 10, 1900.)
(No Model.)
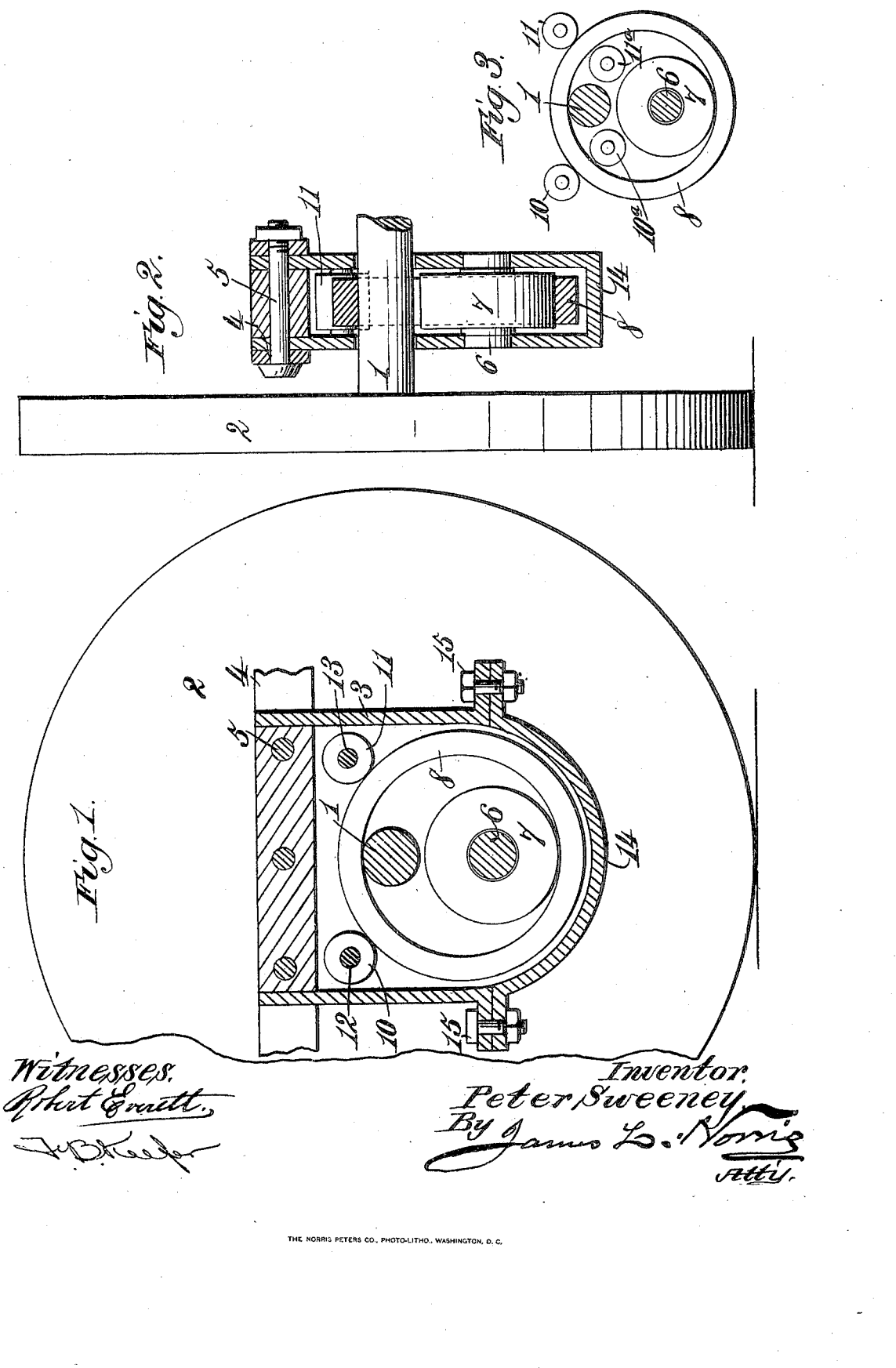
Witnesses.
Inventor.
Peter Sweeney
By James L. Norris
Atty.

UNITED STATES PATENT OFFICE.

PETER SWEENEY, OF NEW YORK, N. Y.

JOURNAL-BEARING.

SPECIFICATION forming part of Letters Patent No. 680,897, dated August 20, 1901.

Application filed September 10, 1900. Serial No. 29,566. (No model.)

*To all whom it may concern:*

Be it known that I, PETER SWEENEY, a citizen of the United States, residing at New York, in the county of New York and State of New York, have invented new and useful Improvements in Journal-Bearings for Vehicles, of which the following is a specification.

My invention relates to an improvement in journal-bearings for vehicles, and has for its object to provide a bearing in which the minimum amount of frictional resistance shall be offered to the rotation of the axle and a large conservation of power be thereby insured.

To this end the invention consists of the features of construction and the combination of parts hereinafter described, and particularly pointed out in the claims.

I have illustrated the invention by the accompanying drawings, wherein—

Figure 1 is a sectional end elevation, and Fig. 2 is a transverse sectional view through my improved bearing. Fig. 3 is a diagrammatic view illustrating a slightly-modified arrangement of the antifriction-rollers.

The numeral 1 indicates the axle of the vehicle, on each end of which is secured a wheel 2.

The numeral 3 indicates the journal-box, one of which is located near each end of the axle. The vehicle-body (not shown) is supported by having a frame member 4 secured to the journal-box by bolts 5. The axle 1 passes through the sides of the journal-box, as shown. Journaled in the sides of the journal-box is a short shaft 6, upon which is mounted a relatively large roller 7. Within the journal-box is located a large bearing-ring 8, which surrounds the axle 1 and roller 7, bearing against the periphery of each. This ring 8 and its coöperating antifriction-rollers, as will presently appear, have to sustain the entire weight of the vehicle. By the construction described it will be seen that the weight of the vehicle is first exerted upon the shaft 6, carrying the roller 7. Said roller bearing against the inner side of the ring 8, the weight is transferred to this ring, which in turn transfers it to the axle, said ring being supported by the axle and bearing upon the upper side only thereof. Thus only a small aggregate amount of surface is offered for frictional engagement between the rotating parts, and as all the parts brought into frictional engagement revolve the actual amount of resistance offered to the free rotation of the shaft 1 is very slight. This result is further secured by the fact that the ring 8 has no central journal-bearing and is in engagement only with the peripheries of the shaft 1 and roller 7 and the small antifriction-rollers 10 11. These antifriction-rollers are mounted on shafts 12 13, journaled in the side walls of the journal-box, and are located on opposite sides of the axle 1 above the ring 8, normally in contact with said ring 8, and they thus aid in sustaining the load of the vehicle. Owing to the relatively large diameter of the ring 8 as compared with that of the axle and of the rollers 7, 10, and 11 the actual amount of surface engagement is very small. The lower portion 14 of the journal-box is removably secured to the upper portion by means of bolts 15 passing through lateral flanges on each and is designed to be supplied with oil or other suitable lubricating material.

My improved journal-bearing is primarily intended for use on automobile vehicles, but manifestly is not limited to such application or to application to vehicles, but may be employed advantageously with any character of device having a revolving shaft or axle supported in a journal-box.

As shown in Figs. 1 and 2 of the drawings and as above described, the antifriction-rollers 10 and 11 are disposed above and in contact with the ring 8, and they thus aid in sustaining the load. If desired, I may employ in addition to the rollers 10 and 11 a second set of rollers $10^a$ $11^a$, as shown in Fig. 3, which, like the rollers 10 and 11, are also journaled in the side walls of the journal-box and disposed on opposite sides of the axle 1, but normally out of contact with the said axle and with the roller 7 and ring 8, but in close juxtaposition thereto. The purpose of these rollers is to afford a lateral bearing for the ring 8 when starting or stopping the vehicle.

What I claim, and desire to secure by Letters Patent, is—

1. In combination with an axle, a journal-box mounted thereon, an annulus or bearing-ring surrounding said axle and supported thereon, and antifriction-rollers located upon opposite sides of the axle and bearing against the periphery of the annulus or bearing-ring, said rollers being arranged so as to aid in sustaining the load.

2. In combination with an axle, a journal-box mounted thereon, a roller journaled in the journal-box, an annulus or bearing-ring surrounding said axle and roller and bearing against the periphery of each, and antifriction-rollers located upon opposite sides of the axle and bearing against the periphery of the annulus or bearing-ring, said rollers being arranged so as to aid in sustaining the load.

3. In combination with an axle, a journal-box mounted thereon, a roller journaled in the journal-box, an annulus or bearing-ring surrounding said axle and roller and bearing against the periphery of each, an antifriction-roller located on each side of the axle and bearing upon the inner face of the ring, and antifriction-rollers disposed outside the ring and bearing against the periphery thereof upon opposite sides of the axle and aiding in sustaining the load.

In testimony whereof I have hereunto set my hand in presence of two subscribing witnesses.

PETER SWEENEY.

Witnesses:
GEORGE W. SWEENEY,
CHARLES HOLBEIN.